(12) United States Patent
Rider (10) Patent No.: US 7,181,995 B2
(45) Date of Patent: Feb. 27, 2007

(54) LINE WORK TOOL AND METHOD THEREOF

(76) Inventor: Jack H. Rider, 2149 N. Highway 113, Carrollton, GA (US) 30116

( * ) Notice: Subject to any disclaimer, the term of this patent is extended or adjusted under 35 U.S.C. 154(b) by 0 days.

(21) Appl. No.: 11/034,626

(22) Filed: Jan. 13, 2005

(65) Prior Publication Data

US 2006/0150779 A1   Jul. 13, 2006

(51) Int. Cl.
*B25B 23/16* (2006.01)
(52) U.S. Cl. .............. 81/53.1; 294/19.1; 7/143; 81/3.8
(58) Field of Classification Search ............... 81/53.1, 81/3.8, 418; 294/19.1; 7/143, 170
See application file for complete search history.

(56) References Cited

U.S. PATENT DOCUMENTS

| | | | |
|---|---|---|---|
| 441,113 A | 11/1890 | Sostmann | |
| 895,404 A | 8/1908 | Jaegle | |
| 1,258,016 A | 3/1918 | Kepner | |
| 1,682,009 A | 8/1928 | Kinney | |
| 1,722,075 A | 7/1929 | Coon | |
| 1,744,356 A * | 1/1930 | Bodendieck | 81/53.1 |
| 1,865,526 A | 7/1932 | Lawlor | |
| 1,965,638 A | 7/1934 | Gerhardt | |
| 2,096,244 A | 10/1937 | Heinrich | |
| 2,330,013 A | 9/1943 | Schultz | |
| 2,379,433 A * | 7/1945 | Hemmerling | 29/273 |
| 2,484,278 A | 10/1949 | Fisher | |
| 2,720,410 A * | 10/1955 | Smith | 294/19.1 |
| 2,739,832 A | 3/1956 | Thorpe | |
| 3,057,233 A * | 10/1962 | Turner | 72/409.12 |
| 3,433,521 A | 3/1969 | Lasko | |
| 3,759,472 A | 9/1973 | Fratta | |
| 3,866,965 A | 2/1975 | Homeier | |
| 3,868,136 A | 2/1975 | Schweitzer, Jr. | |
| 3,871,056 A | 3/1975 | Lyons et al. | |
| 3,888,534 A * | 6/1975 | Hall et al. | 294/19.1 |
| 4,079,978 A | 3/1978 | McMullin | |
| 4,111,518 A | 9/1978 | Zurcher | |
| 4,132,441 A | 1/1979 | Watkins | |
| 4,202,591 A | 5/1980 | Borgstrom | |
| 4,326,316 A | 4/1982 | Dolenti | |
| 4,335,477 A | 6/1982 | Halstead | |
| 4,481,552 A * | 11/1984 | Dona et al. | 360/133 |
| 4,525,006 A | 6/1985 | Nowak et al. | |
| 4,582,352 A | 4/1986 | Filter et al. | |
| 4,670,956 A | 6/1987 | Christensen | |

(Continued)

OTHER PUBLICATIONS

Hubbell Power Systems, Inc., "Tool Catalog", Jan. 1999, pp. 2120-2128, Hubbell/Chance, Centralia, MO.

(Continued)

*Primary Examiner*—Lee D. Wilson
*Assistant Examiner*—Robert Scruggs
(74) *Attorney, Agent, or Firm*—Myers & Kaplan, LLC; Sandra M. Drummond; Joel D. Myers (57) ABSTRACT

A line work tool device and method, wherein a tool guidance structure is provided for tool positioning assistance relative to the target workpiece, such as a high voltage switch, and wherein a unique inverted "L" shaped member extends from the device in such a manner as to facilitate interaction with the switch barrel.

9 Claims, 5 Drawing Sheets

U.S. PATENT DOCUMENTS

| | | | |
|---|---|---|---|
| 4,736,797 A | | 4/1988 | Restarick, Jr. et al. |
| 4,745,680 A | | 5/1988 | Williams et al. |
| 4,955,823 A | | 9/1990 | Luzzi |
| 4,965,930 A | * | 10/1990 | Wnukowski .................. 29/758 |
| 5,123,553 A | | 6/1992 | Burt, III |
| 5,230,142 A | | 7/1993 | Roscizewski |
| 5,299,464 A | | 4/1994 | Bennett |
| 5,312,262 A | | 5/1994 | Bublitz |
| 5,564,852 A | * | 10/1996 | Maxwell et al. ............... 403/97 |
| 5,742,220 A | * | 4/1998 | Scherer ....................... 337/171 |
| 6,022,059 A | | 2/2000 | Regamey |
| 6,474,197 B1 | * | 11/2002 | Browen et al. ............... 81/3.8 |
| 6,487,765 B1 | | 12/2002 | Brekken |
| 6,518,871 B2 | * | 2/2003 | Fennell ....................... 337/171 |
| 6,642,464 B1 | * | 11/2003 | Taylor ......................... 200/331 |
| 6,725,745 B1 | * | 4/2004 | Palmieri ...................... 81/53.1 |
| 6,756,776 B2 | | 6/2004 | Perkinson et al. |
| 2003/0192173 A1 | | 10/2003 | Whitehead |

OTHER PUBLICATIONS

W.H. Salisbury & Co., "www.whsalisbury.com", 7520 North Long Avenue, Skokie, IL 60077, Tel. 847-679-6700.
Hastings, "Accessories Catalog", Jul. 2001, pp. F2-F6, Hastings Hot Line Tools, Hastings, MI.

* cited by examiner

LINE WORK TOOL AND METHOD THEREOF

FIELD OF THE INVENTION

The present invention relates generally to line work tools, and more particularly, to a line work tool device and method thereof, wherein uniquely shaped tool components facilitate manipulation of high voltage connections and the like. The present invention is particularly suited for, although not limited to, use as a disconnect tool, wherein utilization of the line work tool device via a hot stick enables quick, consistent contact with a cut-out barrel, and easy and secure engagement of a switch barrel, or ring, thereby enabling reproducibly fast switch disconnection.

BACKGROUND OF THE INVENTION

Numerous line work tools are available for use on, or as a working component of, an elongated, insulated rod commonly referred to as a hot stick, or shotgun stick. Linemen typically stand on the ground, holding one end of the hot stick and directing the extended end bearing the line work tool in order to accomplish a given task. The line work tools are thus generally specific in their purpose, and are generally able to be interchangeably mounted to the hot stick.

For example, some line work tools are shaped to facilitate installation techniques. Others have been designed to assist in the manipulation of tree branches and/or hanging lines. Still others have been provided as a means of delivering a forceful blow to particular high voltage hardware, such as clamps and conductors. More others have been described as disconnect tools.

Disconnect procedures are necessitated in order to control, interrupt or otherwise stop the flow of power from the primary line through a switch, typically mounted on an aerial structure, or pole. Unfortunately, these procedures must often be performed in stormy and/or windy conditions; and poor environmental circumstances usually serve to increase the difficulty and danger of such jobs. That is, in order to disconnect a typical barrel switch, a small ring must be engaged by the lineman, oftentimes from a position some thirty or forty feet below, wherein a physical pulling force then serves to uncouple the switch components, disrupting the flow of power.

Common disconnect tools employ a generally straight prong member, wherein the lineman must first move his hot stick upwards in order to align the extended prong with the cut-off pull ring, and then he must move his hot stick generally sideways in order to direct the prong member through the cut-off pull ring. In rainy or other conditions that inhibit visibility, and/or under windy conditions, such exacting positioning is difficult, if not impossible.

Therefore, it is readily apparent that there is a need for a line work tool device, wherein manipulation of high voltage connections is facilitated via quick, consistent, easy and secure engagement of a switch barrel, or ring, thereby avoiding the above-discussed disadvantages.

BRIEF SUMMARY OF THE INVENTION

Briefly described, in a preferred embodiment, the present invention overcomes the above-mentioned disadvantages and meets the recognized need for such a device by providing a line work tool device and method, wherein a tool guidance structure is provided for tool positioning assistance relative to the target workpiece, such as a high voltage switch, and wherein a unique inverted "L" shaped member extends from the device in such a manner as to facilitate interaction with the switch barrel.

According to its major aspects and broadly stated, in its preferred form, the present invention is a disconnect tool that enables a user to quickly, easily, and safely engage an overhead cut-off switch, to move the tool in a controlled and generally direct manner to a desired work position, and to manipulate and guide the tool during its interaction with the target workpiece, efficiently and reproducibly performing the disconnect procedure essentially irrespective of weather and/or visibility conditions.

More specifically, the device of the present invention in its preferred form is a line work tool device comprising a central body with a mount structure enabling utilization on a hot stick, wherein the distal end of the central body preferably defines a cutout receiving port, and wherein a ring engagement member preferably extends outwardly from the central body. The relative positioning of the cutout receiving port and the ring engagement member provides for reproducible access to a cutout barrel, wherein the cutout receiving port is shaped to facilitate slidable movement of the line work tool device upward, along the length of the cutout, and wherein the cutout receiving port essentially secures the positioning of the line work tool device relative to the cutout barrel, or ring, via interaction with the barrel end cap, or cutout structure.

In the preferred form, a first length of the ring engagement member extends from the front surface of the central body, wherein the front surface faces toward the user as the user extends the mounted tool for use. The ring engagement member defines a preferred inverted "L" shape, wherein a second length of the ring engagement member extends from the first length, transversely to the length of the central body. That is, the first length of the ring engagement member is preferably and generally perpendicular to the front surface of the central body and to the second length thereof, and wherein the second length of the ring engagement member is preferably and generally parallel with the front surface of the central body.

In addition, the preferred form of the present invention further provides a traditional prong member, extending outwardly from the distal end of the central body, proximate the cutout receiving port, in the same direction and generally parallel with the second length of the ring engagement member. It is also preferred that a claw member is provided, also extending outwardly from the distal end of the central body, and also proximate the cutout receiving port. The claw member, however, is opposingly positioned relative the traditional prong member, and defines a hook-shaped region generally between the claw member and the central body.

A feature and advantage of the present invention is the ability of such a device and method to facilitate manipulation of high voltage connections and the like.

Another feature and advantage of the present invention is the ability of such a device and method to enable quick, consistent contact with a cutout barrel.

Another feature and advantage of the present invention is the ability of such a device and method to enable easy and secure engagement of a switch barrel, or ring, thereby enabling reproducibly fast switch disconnection and/or connection.

Still another feature and advantage of the present invention is its ability to perform multiple tool functions, including delivery of pushing forces, pulling forces, and forceful, hammer-like blows.

Another feature and advantage of the present invention is the ability of such a device and method to assist in the manipulation of tree branches and/or hanging lines.

Yet another feature and advantage of the present invention is the ability of such a device and method to retain functionality under poor environmental conditions.

Another feature and advantage of the present invention is the ability of such a device and method to essentially eliminate the need for the lineman to selectively position and/or visibly align his tool relative the targeted cut-off pull ring.

Another feature and advantage of the present invention is the ability of such a device to optionally and interchangeably perform via traditional manipulative techniques as practiced with known tools.

Another feature and advantage of the present invention is the ability of such a device to enable a user to deliver pushing, as well as pulling, forces to a workpiece.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Figure 1A:
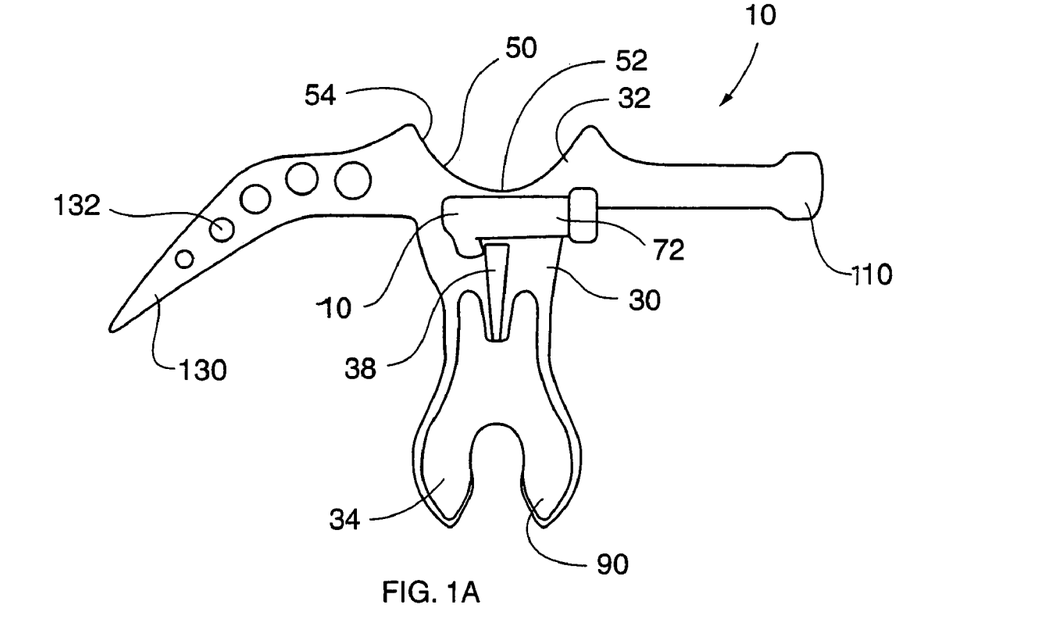
FIG. 1A is a front view of a line work tool device, according to the preferred embodiment of the present invention.
Figure 1B:
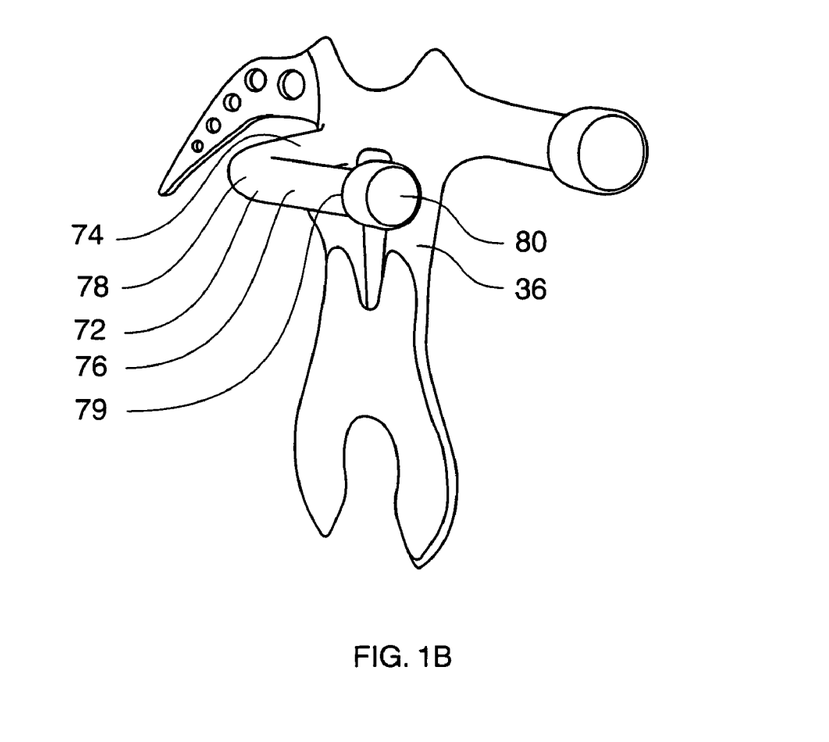
FIG. 1B is a perspective view of the line work tool of FIG. 1A.
Figure 2:
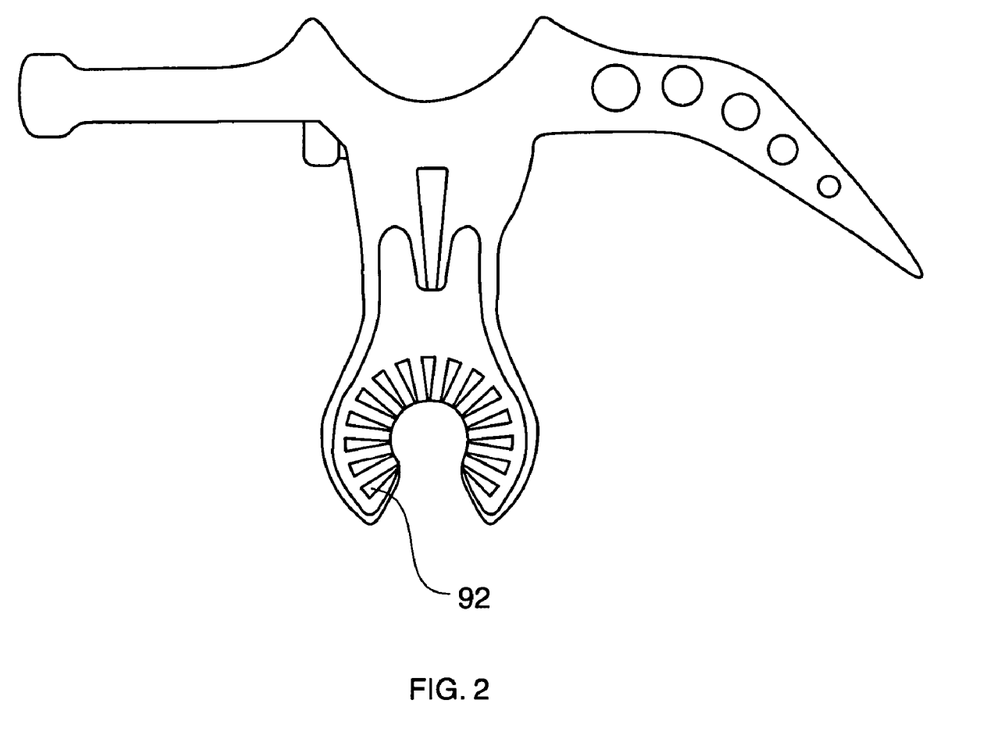
FIG. 2 is a rear view of the line work tool of FIG. 1A.

Referring now to FIGS. 1A–B and 2, the present invention in the preferred embodiment is line work tool device 10, and method thereof, comprising central body member 30, tool guidance structure 50, ring engagement member 70, mount structure 90, prong member 110, and claw member 130. It is important to understand that the present invention is suitable for utilization for any manipulative technique requiring use of such a tool in combination with a generally elongated support member, generally arms-length or greater, such as, for exemplary purposes only, turning on taps, opening train switches, closing barrel switches, pushing and pulling wires, taking off line hoses, pushing and pulling tree limbs, and disconnecting power connections; therefore, while the device and method of the present invention is described conveniently with the preferred utilization as a disconnect tool for a switch A, it is not limited to application or implementation with only such switches, nor is it limited to performing disconnects.

Figures 3A, 3B:
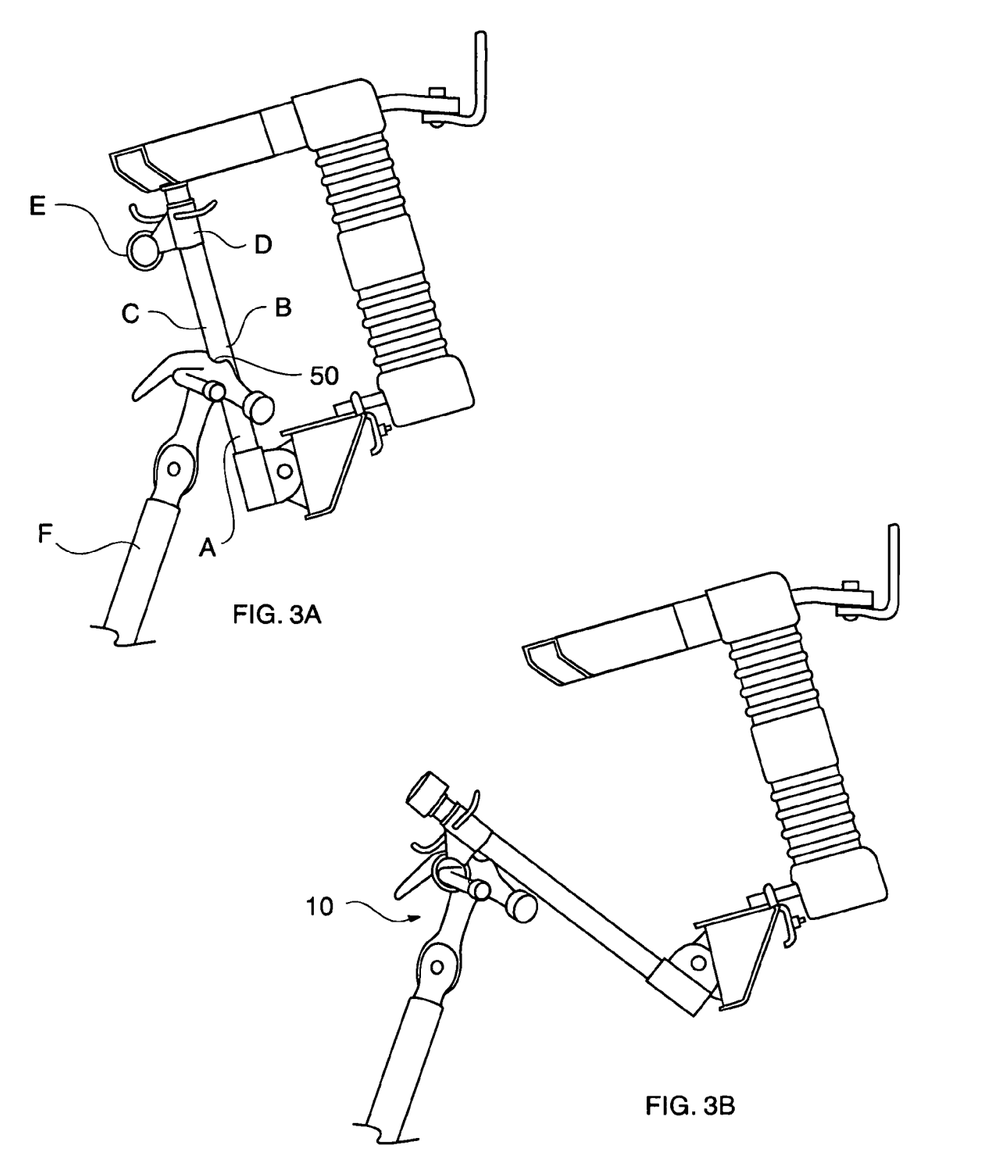
FIG. 3A is a side view of the line work tool device of FIG. 1, showing the cut-out receiving port positioned proximate a cut-out barrel of a closed switch.
FIG. 3B is a side view of the line work tool device of FIG. 1, showing the ring engagement member positioned proximate a cut-out ring of an opened switch.

In the preferred form, top end 32 of central body member 30 defines tool guidance structure 50, and bottom end 34 of central body member 30 carries mount structure 90. Preferably, tool guidance structure 50 is arcuately-shaped, thereby defining generally U-shaped cut-out receiving port 52, preferably comprising generally smooth, or rounded, edge 54. As shown in FIG. 3A, tool guidance structure 50 is shaped to enable generally transverse engagement with a cut-out barrel B on a switch A, whereby slidable movement along the outer surface C of barrel B is facilitated, essentially irrespective of the angle between central body member 30 and barrel B. Further, as shown in FIG. 3B, tool guidance structure 50 is preferably shaped to rendezvous with cut-off end cap D, or other relevant structure, whereby further slidable movement of central body member 30 relative to barrel B is preferably prohibited. The relative positioning of cutout receiving port 52 and ring engagement member 70 preferably facilitates reproducible access to a cutout barrel B, wherein cutout receiving port 52 essentially secures the positioning of line work tool device 10 relative to the cutout barrel B, and ring E, via interaction with barrel end cap D. Tool guidance structure 50 is also adapted to perform traditional activities known in the art, such as, for exemplary purposes only, opening switches for trains, turning taps on, and/or pushing wire or tree limbs.

In order to facilitate maximization of strength and general minimization of weight, it is preferred that central body member 30 define a generally elongated aperture 38. However, central body member 30 could be formed as a generally solid member, or with a plurality of alternately configured apertures in order to accomplish the same purpose.

Preferably, ring engagement member 70 comprises hook arm 72, wherein first segment 74 of hook arm 72 preferably extends outwardly from front surface 36 of central body member 30, and wherein second segment 76 of hook arm 72 preferably extends from first segment 74, defining bend 78 between first segment 74 and second segment 76. Thus, hook arm 72 70 preferably defines an inverted "L" shape, wherein second segment 76 preferably extends transversely to the length and generally parallel with front surface 36 of central body member 30, and first segment 74 is preferably and generally perpendicular to front surface 36 of central body member 30 and to second segment 76. Preferably, tip 80 is defined proximate distal end 79 of second segment 76, wherein tip 80 has a diameter preferably greater than the diameter of second segment 76. That is, tip 80 preferably defines a flanged shape, or otherwise oversized tip area in order to enable engagement with a selected workpiece. Thus, the relative positioning of cutout receiving port 52 and ring engagement member 70 facilitates reproducible access to a cutout barrel B, wherein cutout receiving port 52 essentially secures the positioning of line work tool device 10 relative to the cutout barrel B, and in alignment with ring E such that rotational action imparted by a user facilitates engagement of ring E.

Figure 4:
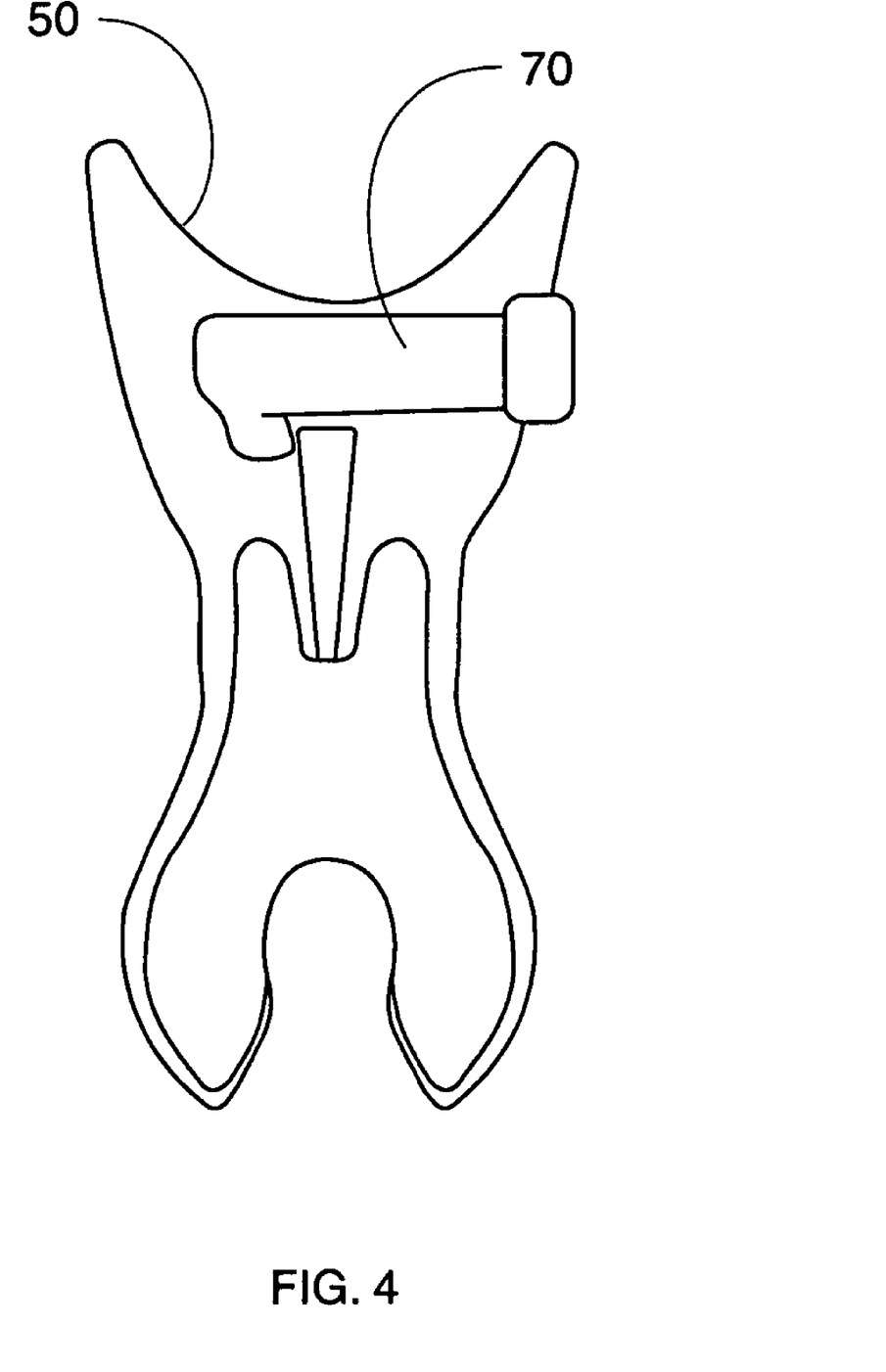
FIG. 4 is a front view of a line work tool device, according to an alternate embodiment of the present invention.
Figure 5:
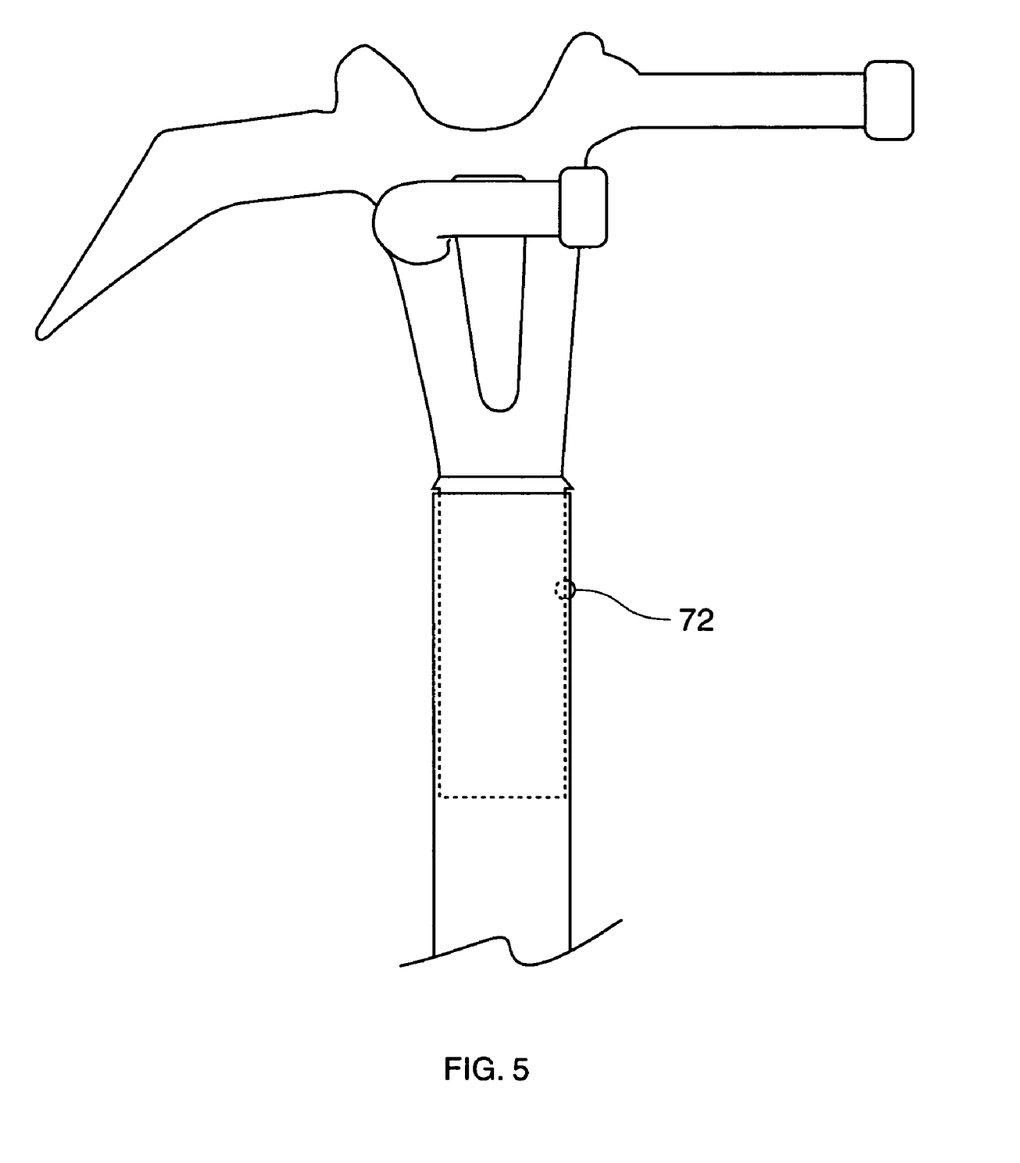
FIG. 5 is a perspective view of a line work tool device, according to an alternate embodiment of the present invention, showing the device on a hot-stick.

In the preferred embodiment, claw member 130 is provided, extending outwardly from central body member 30, for utilization of various routine tasks, such as, for exemplary purposes only, to remove line hoses and/or pull wire out of trees. Although it is preferred that claw member 130 is provided on line work tool device 10, in an alternate embodiment, central body member 30 could be formed without claw member 130, as depicted in FIG. 4. Preferably, a plurality of apertures 132 are defined through claw member 130, thereby reducing the weight thereof without negatively impacting structural strength. Alternately, claw member 130 could be substantially solid, without plurality of apertures 132, as depicted in FIG. 5.

Preferably, line work tool device 10 includes prong member 110, wherein this traditionally shaped, essentially straight projection enables use in traditional tasks, such as, for exemplary purposes only, to close a cutout switch A, to push or pull a barrel B, and/or to deliver hammer-like blows. As with claw member 130, although it is preferred that prong member 110 is provided on line work tool device 10, in an alternate embodiment, central body member 30 could be formed without prong member 110, as depicted in FIG. 4.

Mount structure 90 is preferably defined proximate bottom end 34 of central body member 30, whereby an extension tool, such as, for exemplary purposes only, an extended rod, a telescoping stick, a hot stick and/or EXTEND-O-STICK may preferably and removably be mounted. Preferably, mount structure 90 is magnetic, with plurality of notches 92 defined to engage traditional wingnut engagement structures defined on extension tools known in the art. Although mounting with a traditional wingnut engagement structure is preferred, mount structure 90 could be formed to accommodate any type of workpiece adaptor, such as pressure-ball system 94 as is shown in FIG. 5, threaded-locking engagement, or any other suitable structure.

In the preferred embodiment, line work tool device 10 is brass, however other appropriate materials could be utilized.

In the preferred use, referring to FIGS. 3A and 3B, line work tool device 10 is preferably attached to extension tool F, wherein extension tool F is of a length and/or structure as desired by the user, and without limitation. Preferably, the extension tool F is extended over head by the user, with front surface 34 of central body member 30 facing toward the user. In this preferred position, generally U-shaped cut-out receiving port 52 is positioned proximate a cut-out barrel B on a switch A, then transversely engaged with the cut-out barrel B, as depicted in FIG. 3A, and subsequently slidably moved along the outer surface C of the cut-out barrel B in a generally upward direction.

Tool guidance structure 50 preferably rendezvous with cut-off end cap D, as shown in FIG. 3B, whereby further slidable movement of central body member 30 relative to barrel B is prohibited. The preferred positioning of cutout receiving port 52 and ring engagement member 70 thus facilitates reproducible access to a cutout barrel B, generally irrespective of visibility of the user, and wherein cutout receiving port 52 essentially secures the positioning of line work tool device 10 relative to the cutout barrel B, and ring E, via interaction with barrel end cap D, again generally irrespective of the visibility of the user, who may be positioned as much as 30 or 40 feet below.

After ring engagement member 70 is in position along cut-out barrel B, and proximate ring E, the user simply rotates, or twists, extension tool F, thereby rotating second segment 76 of hook arm 72 through ring E. A downward force from the user via extension tool F delivers a pulling force via hook arm 72 to disengage the switch A, wherein tip 80 functions to prevent undesirable slippage, or removal of hook arm 72 from the ring E.

In an alternate embodiment, hook arm 72 could extend from the obverse surface, or could extend from the opposite direction, thereby enabling utilization by either left-handed or right-handed line workers.

In another alternate embodiment, central body member 30 could be formed without claw member 130, or without prong member 110, or without either claw member 130 and prong member 110.

In still another alternate embodiment, line work tool device 10 could be formed without hook arm 72, wherein tool guidance structure 50 could be incorporated into traditional line work disconnect tools.

In another alternate embodiment, line work tool device 10 could be permanently, or integrally adapted to a hot stick or shotgun stick, in lieu of being removable or retrofittable.

In yet another alternate embodiment, line work tool device 10 could be utilized with a short pole to enable use for underground switches.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

I claim:

1. A method of disconnecting a switch, comprising the steps of:
    a) obtaining a disconnect tool comprising a central body member with a U-shaped distal end, an L-shaped hook arm with a flanged tip, and a pole mount structure;
    b) obtaining an elongated pole;
    c) mounting said disconnect tool to said elongated pole;
    d) extending said disconnect tool over a user's head with said L-shaped hook arm facing the user, facing away from the front of the closed cut-out switch barrel, and said U-shaped distal end proximate the front of the closed cutout switch barrel;
    e) transversely engaging said U-shaped distal end of said disconnect tool with the front of the cut-out switch barrel;
    f) sliding said disconnect tool in an upward direction along the front of the cut-out switch barrel to a position proximate the disconnect ring;
    g) twisting said elongated pole, thereby twisting said disconnect tool, wherein said U-shaped distal end of said disconnect tool remains engaged with the cut-out switch barrel, and wherein said flanged tip of said L-shaped hook arm extends through the disconnect ring;
    h) disconnecting the switch by exerting a pulling force on the disconnect ring via said L-shaped hook.

2. The method of disconnecting a switch of claim 1, wherein said disconnect tool further comprises a prong member extending outwardly from a side of said central body member.

3. The method of disconnecting a switch of claim 1, wherein said disconnect tool further comprises a claw member extending outwardly from a side of said central body member.

4. The method of disconnecting a switch of claim 3, wherein said claw member comprises a plurality of apertures defined therethrough.

5. The method of disconnecting a switch of claim 1, wherein said disconnect tool further comprises a prong member and a claw member, said prong member and said claw member opposingly extending from said second end of said central body member, proximate said tool guidance structure, together defining a T-shape for said central body member.

6. The method of disconnecting a switch of claim 1, wherein said central body member of said disconnect tool defines an elongated central aperture.

7. The method of disconnecting a switch of claim 1, wherein said pole mount structure is a pressure-ball system.

8. The method of disconnecting a switch of claim 1, wherein said pole mount structure is a threaded system.

9. A line work tool, comprising:

a generally T-shaped, essentially planar body defined by a crosspiece member and a base member, each said member having a front surface and a rear surface, said base member extending outwardly from a generally central point of said crosspiece member, wherein said base member has a bottom end and a top end, said top end defined proximate said crosspiece member and said bottom end defining a mount structure for receiving an extension pole;

a finger-like structure protruding outwardly from said plane of said front surface of said generally T-shaped, essentially planar body, proximate the point of intersection of said base member and said crosspiece member; and a crescent-shaped guide centrally defined in said crosspiece member opposite said point of intersection of said base member and said crosspiece member, and relative to said finger-like structure such that engagement of said crescent-shaped guide with the front surface of a closed fuse body positions said rear surface of said generally T-shaped, essentially planar body proximate the front surface of the closed fuse body, such that slidable movement of said generally T-shaped, essentially planar body along the length of the front surface of the closed fuse body is enabled via said crescent-shaped guide, such that rotational movement of said generally T-shaped, essentially planar body via said crescent-shaped guide relative to the closed fuse body positions said finger-like structure through the pull ring of the closed fuse body, such that the plane of the pull ring is essentially perpendicular to the plane of said generally T-shaped, essentially planar body, and such that delivery of a pulling force to the pull ring via said finger-like structure so positioned opens the fuse body, and wherein rotational movement of said generally T-shaped, essentially planar body relative to the open fuse body positions said generally T-shaped, essentially planar body in a coplanar relationship with the pull ring, such that said front surface of said generally T-shaped, essentially planar body is positioned on one side of the pull ring and said finger-like structure extends through the pull ring to a position on the opposing side of the pull ring, such that delivery of a pushing force to the pull ring via said finger-like structure so positioned removes and supports the fuse body.

* * * * *